United States Patent [19]
Vaughn, Jr. et al.

[11] 3,959,563

[45] May 25, 1976

[54] METHOD FOR RENDERING VITREOUS SURFACES WATER REPELLANT AND DIRT DEPOSIT RESISTANT AND ARTICLES PRODUCED THEREBY

[75] Inventors: Howard A. Vaughn, Jr., Schenectady, N.Y.; Vincent Vodicka, South Euclid, Ohio

[73] Assignee: General Electric Company, Waterford, N.Y.

[22] Filed: Nov. 2, 1973

[21] Appl. No.: 412,268

[52] U.S. Cl. ............................... 428/429; 427/314; 427/398; 428/447
[51] Int. Cl.² ........................................ B32B 17/06
[58] Field of Search .................... 117/124 F, 135.5; 427/162–169, 314, 372, 374, 387, 398; 428/426, 428, 429, 447

[56] References Cited
UNITED STATES PATENTS

| | | | |
|---|---|---|---|
| 2,504,482 | 4/1950 | Goldman | 128/272 |
| 3,801,361 | 4/1974 | Kitaj | 117/124 F |

FOREIGN PATENTS OR APPLICATIONS

| | | | |
|---|---|---|---|
| 705,854 | 3/1965 | Canada | 117/124 F |
| 887,755 | 1/1962 | United Kingdom | 117/124 F |

*Primary Examiner*—Thomas J. Herbert, Jr.
*Assistant Examiner*—Bruce H. Hess
*Attorney, Agent, or Firm*—John L. Young; E. Philip Koltos; Edward A. Hedman

[57] ABSTRACT

Articles having a scrub resistant, water repellant and dirt resistant vitreous surface are provided by (a) heating the article to a surface temperature above 400°C, until the surface becomes free of water; (b) adjusting the surface temperature to between 310° and 370°C. and applying a siliconizing medium comprising an organosiloxane; and (c) allowing the article to cool to ambient temperature.

41 Claims, No Drawings

METHOD FOR RENDERING VITREOUS SURFACES WATER REPELLANT AND DIRT DEPOSIT RESISTANT AND ARTICLES PRODUCED THEREBY

This invention relates to water repellant and dirt deposit resistant treatments for vitreous surfaces. More particularly, it provides articles with vitreous surfaces in which hydrophobic and dirt deposit characteristics have been provided by application of a siliconizing medium under specified conditions.

BACKGROUND OF THE INVENTION

Vitreous surfaces may be found on articles of glass, vitrified or enameled articles, articles of quartz, articles of silica and siliceous derivatives, and the like. Treatments to render such surfaces water repellant, or hydrophobic are well known, and are applied, for example, to make bottles drain more completely, to make windshields easier to see through in the rain, to maintain the electrical integrity of porcelain insulators, and the like. However, a dirt deposit resistive feature does not usually accompany such treatments and, in fact, if a silicone coating is used as part of the treatment, the hydrophobic surfaces often attract rather than repel dirt.

For many uses, and particularly in the manufacture of sealed beam type automobile lamps, and exterior window glass, it would be very desirable to provide the outwardly presented vitreous surface with characteristics facilitating the removal of road dirt or air borne dirt. It would also be desirable to provide such characteristics with siliconizing media because of the high efficiency of such media in promoting water repellancy.

Such a treatment should assure reasonable permanency to rubbing and scrubbing or other types of cleaning without loss of the hydrophobic properties of the treated vitreous surfaces. The treatment should also provide a dirt resistive surface, that is, one upon which dirt would not tend to deposit and stick, but even if it should, it would be removed with ease.

The above objectives have been achieved according to the present invention by a unique high temperature interaction of the vitreous surface with a siliconizing medium. The desired reaction takes place considerably above the normal application temperature of similar silicone treatments. The unique results are obtained with vitreous surface temperatures between about 310° and about 370°C. at the time of treatment with the siliconizing medium, and the vitreous surface must be dewatered by heating, e.g., at a temperature of above 400°C. before the treatment. It has been found that if the dewatering step is omitted, the desirable surface characteristics are destroyed during rubbing or similar abrading.

Vitreous surfaces have been siliconized in the prior art under conditions which are superficially similar to those disclosed herein, but in most cases the application temperature is at ambient temperature and the curing temperature is only up to about 250°C. In Kramer et al., U.S. Pat. No. 2,630,656, sheet glass is siliconized at between 38° and 204°C. (100°–400°F.). The glass plates in Hyde, U.S. Pat. No. 2,439,689, are heated at 220°C. for 15 minutes. The polysiloxane coated glass tubes of Goldman, U.S. Pat. No. 2,719,098, are heated in an oven in which the temperature is raised from 100°C. to 250°C. then held for two hours. In Schaefer, U.S. Pat. No. 2,895,846, milk bottles are sprayed with a silicone emulsion and this is bonded thereafter by heating at 149° to 232°C. (300°–450°F.).

On the other hand, the vitreous surface of hot molten glass has been siliconized at temperatures substantially above the range used herein. In one case, Badger, U.S. Pat. No. 2,881,566, used siliconizing at 938° to 1371°C. (1800°F.–2500°F.) to increase the "chemical durability" of the glass.

Two processes for siliconizing glass are known in which the treatment temperature is near to the lower limit of the range discovered in the present invention. The drain-clear containers of Goldman, U.S. Pat. No. 2,504,482 are prepared by coating bottles with a methyl silicone fluid in chloroform and thereafter baking at 300°C. for one-half hour. The vitreous surfaces in U.K. 887,–755 are siliconized by spraying with an organosiloxane onto the glass "while hot", without specifying the glass temperature. However, it is stated that the organopolysiloxane itself is to be applied at a temperature of about 300°C.

One process is known in which the vitreous surface is treated with a siliconizing medium at a treatment temperature overlapping the lower end of the critical range of the present invention. Thus, in Canadian Pat. No. 705,854, vitreous surfaces are treated at 200°–350°C. with a fog of a diorganosiloxane vapor.

The present development provides results which are not obtained from the methods described in U.S. Pat. No. 2,504,482; U.K. No. 887,–755 and Canadian Pat. No. 705,854, however, because of the scrub resistant permanency of the present treatment. As has been mentioned above, unless the vitreous surface is dewatered with a critical heating step prior to the siliconization at 310° to 370°C., the characteristics produced can literally be scrubbed off and the resulting articles are of little commercial value, especially when they are to be exposed outdoors, such as the case with automobile headlamps.

Very few of the prior workers in this field have recognized the value of applying the siliconizing medium to a hot vitreous surface, and of those who did, none appreciated the need to dewater the surface before treatment to assure rub resistance.

DESCRIPTION OF THE INVENTION

According to the present invention, there is provided a method for producing water repellant and dirt deposit resistant characteristics on a vitreous surface of an article, the method comprising:

a. heating an article having a vitreous surface to a surface temperature of above about 400°C. until the surface of said article is substantially free of water;

b. adjusting the surface temperature of said article to from about 310° to about 370°C. and applying to the surface of said article a siliconizing medium comprising an organosiloxane; and c. allowing said article to cool to ambient temperature.

According to another preferred feature of this invention, there are provided articles having a water repellant and dirt resistant vitreous surface, the water resistant and dirt resistant characteristics having been provided by the method as above recited.

The optimum results are obtained if the vitreous surface of the article is between 310° and 370°C., and the vitreous surface must be treated to remove water, e.g., by heating above 400°C., and preferably, at about 500°C. for a sufficient time, e.g., 5 to 30 minutes, prior to application of the siliconizing medium. After dewatering, it is convenient to lower the temperature to about 350°C. and then the silicone compound or compounds are applied to the hot surface as a spray, fog, or any other obviously equivalent method, and then after a holding period, if desired, the object is allowed to cool to ambient temperature, i.e., the temperature of the normally surrounding environment, e.g., 20°–25°C.

The organosiloxanes which provide effective results include organosiloxanes having hydroxy or alkoxy terminal groups. They will have at least one silicon-carbon bond. These can be either linear or branched polysiloxanes. In the organosiloxane, the silicon-carbon bonds can be silicon-bonded alkyl groups, e.g., methyl, ethyl, propyl and octadecyl; silicon-bonded aryl groups, e.g., phenyl, diphenyl and anthracyl; silicon-bonded alkenyl groups, e.g., vinyl, allyl and octadecenyl; silicon-bonded alkaryl groups, e.g., tolyl, xylyl and methylnaphthyl, silicon-bonded aralkyl groups, e.g., benzyl and phenylethyl, silicon-bonded cycloaliphatic groups, e.g., cyclopropyl, cyclopentyl and cyclohexyl, silicon-bonded cyanoalkyl, e.g., cyanoethyl, cyanopropyl, silicon-bonded haloalkyl, e.g., chloroethyl, fluoroethyl, and mixtures of any of the foregoing. Preferably, in the alkyl or alkoxy group (if present), the number of carbon atoms will be from 1 to 7. Especially preferably, the organosiloxanes will contain silicon-bonded alkyl groups, silicon-bonded phenyl groups or a mixture thereof. If the organosiloxane contains both silicon-bonded alkyl groups and silicon-bonded aryl, e.g., phenyl groups, preferably the alkyl groups will predominate and especially preferably, they will be methyl groups.

The siliconizing medium can include one or more types of organosiloxanes, and the preferred media will comprise a blend of at least two polysiloxanes. Especially preferred such blends will have one component having only methyl substituents and a high proportion of silanol groups, and a second component having both methyl and phenyl substituents and silanol chainstopping units. A preferred component of the first type is made up of trimethylsiloxy, dimethylsiloxy and methyl siloxy units with silanol chainstopping units of the general formula:

wherein a is from about 0.02 to about 1.0, preferably about 0.035; b is from about 0.11 to about 1.4, preferably about 0.25; and c is 1.0

Another preferred component in blends is made up of dimethylsiloxy and diphenylsiloxy units with silanol chainstoppers, such as

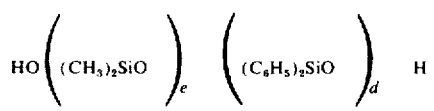

wherein d is from about 0.1 to about 0.4 and e is 1.0

Other preferred organosiloxanes are polydialkylsiloxanes having hydroxy or alkoxy terminal groups, a copolymer of dimethylsiloxy and diphenylsiloxy units having alkoxy end groups, or a cyclic organopolysiloxane, e.g., of the general formula:

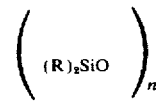

wherein n is 3, 4, 5 or 6, and R is alkyl, aryl, alkaryl, aralkyl, cycloaliphatic, alkenyl, cyanoalkyl, haloalkyl, and the like, as illustrated above. An illustrative cyclic compound is octamethylcyclotetrasiloxane.

In an especially preferred blend, one of the components is of the formula:

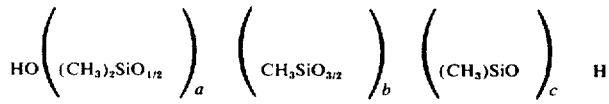

and corresponds to the product of hydrolyzing 50–75% by weight of $(CH_3)_2SiCl_2$; 1–10% by weight of $(CH_3)_3SiCl$; and 10–35% by weight of $CH_3SiCl_3$, and a second organopolysiloxane in said blend is a copolymer of the formula:

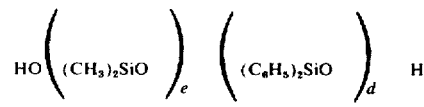

wherein d is from about 0.14 to about 0.25 and e is 1.0, and in which the diphenylsiloxy units are from 28 to 40% by weight of the total weight of the recurring units. If, for example, a blend of 50 wt. % of each component is applied to glass under the prescribed conditions, superior characteristics are provided not only on sealed beam headlamps (borosilicate glass) but also on soda lime glass and standard Pyrex glass.

The preferred organopolysiloxanes can be easily prepared by those skilled in the art and are also available from commercial sources. The hydroxy and alkoxy terminated dialkylsiloxanes; the cyclic diorganosiloxane polymers; and the linear diorganosiloxane copolymers are prepared, e.g., as described in Lampe, U.S. Pat. No. 3,696,090, and references cited therein. The polymers having a high proportion of silanol groups are prepared by methods described, for example, in Brewer et al, U.S. Pat. No. 3,135,713. These patents are incorporated herein by reference.

The chemical nature of the product which is formed on the vitreous surface is not completely understood at this time and analytical techniques, such as total reflectance spectroscopy, X-ray activation analysis and electron microscopy, have not aided in the elucidation of the structure. All that can be said is that the novel characteristics of the surface treatment reside in a hard, hydrophobic, and difficultly removable outwardly presented layer. The treated surface does not retain dirt and if dirt should deposit on the surface, it can be removed with light scrubbing. For these reasons, the novel articles of this invention are claimed with reference to their method of production.

As will be seen from the appended examples, the reaction between the vitreous surface and the silicone compounds is quite specific. Glass or other vitreous surfaces above or below the above described reaction treatment temperature will not produce a scrub resistant hydrophobic surface. The cooling in air after the silicone treatment is also important. Prolonged heating at above 370°C. destroys the desirable surface characteristics. It has been found that the durability of the coating is actually improved, however, by annealing at temperatures between about 100° and 200°C. so this optional step is a preferred feature of the invention. Conveniently, the annealing step will be at about 150°C. for from 10 minutes to 6 hours, e.g., for 1 hour.

The optimum cycle in most cases is 10 minutes at 500°C.; 10 minutes at 350°C., spray with siliconizing medium; and allow to cool.

DESCRIPTION OF THE PREFERRED EMBODIMENTS

The following examples illustrate the process and describe the articles of the present invention. They are not to be construed as limiting.

The first specimens are prepared by squirting from a hydrodermic syringe a small quantity of silicone fluid or diluted silicone directly onto the hot glass contained in a reaction chamber.

Subsequent specimens are prepared by using an air brush atomizing the silicone treating solution onto the glass. A chlorinated solvent is used as a diluent as a matter of convenience. In a commercial manufacturing facility, the atomizer can be used to spray 100% silicone fluid.

The glass is first dewatered by heating to 500°C. Glass that is not dewatered, even if it has been aged for any length of time, e.g., by heating only to 350°C. does not pass the rub test, after treatment according to this invention.

Two tests, the rub test and the dirt test are used to evaluate the surfaces.

RUB TEST

This test measures the durability of any given treatment. After the glass has been tested according to this invention, it is washed with a solution of detergent (Alkanox) in water. It is then thoroughly rinsed with tap water. Cleansing powder (Ajax) is sprinkled on the glass and the surface is scoured by fifty back and forth strokes of one's index finger exerting slight pressure. (The scouring is done in one narrow strip for all fifty strokes). The glass is thoroughly rinsed with tap water and patted dry with a paper towel. Using a cotton swab the glass surface was then painted with quick drying, red recorder ink (Varian). Especially suitable is the ink known as RED-18, which is made by Graphic Controls Corp., P.O. Box 655, Cherry Hill, New Jersey, 08034. The ink will not adhere to the silicone treated surface but, rather, stays on the swab. Where the silicone treatment has been scoured off, or on untreated glass, the red ink "takes" nicely. The rub test ratings on a numerical scale of 0–10 are Poor, 0–2; Fair 2–4; Good 4–8; and Excellent 8–10. Excellent indicates no red ink on the surface. Poor indicates that most of the scoured strip takes the ink.

DIRT TEST

The treated glass lenses are either given a post cure at 150°C. for 1 hour or treated with dirt immediately. Before dirt treatment, the glass is washed with detergent (Alkanox) solution, rinsed and dried.

The dirt used is obtained by collecting snow from underneath automobile fenders after a severe snow storm in Cleveland, Ohio. The snow is melted and most of the supernatant water is decanted.

The concentrated Cleveland dirt suspension is sprayed on the lenses and allowed to dry. Photometric readings are taken of the light of a lamp projected through the lenses. (The initial reading is 50 on a clear, clean lens.) This is repeated until the photometric reading is 15. The dirty lenses are then heated at 115°C. for 15 minutes. They are then rinsed with tap water in a spray fashion. Photometric readings are again taken. The lenses are then washed with a wet sponge, in the exact same pattern every time, and photometric readings are taken again. Control values for the untreated glass with a spray rinse range from 18.5 to 24.0; and for the wet sponge wash, from 47.0 to 48.0.

It is significant that it takes two to three times more dirt treatments on the treated lenses as on the controls to achieve a photometric reading at 15 or less. This indicates that the treated surface is very resistant to dirt depositions. When the dirt suspension is sprayed on untreated glass, it sheets out, drying very rapidly, and leaving a uniform gray coating. When the water borne dirt is sprayed on the treated glass, it beads up. If the spray is continued, the beads of dirty water build up in size to the point that they roll off leaving clean glass. A blast of air will blow the droplets of water borne dirt right off the lens.

In the following examples, all parts are by weight.

EXAMPLE 1

A glass lens is cleaned as described above, then heated for 10 minutes at 500°C. until the surface is substantially free of water, then for 10 minutes at 350°C. The hot surface is sprayed with a siliconizing medium comprising 20 parts of a methoxy chain-stopped dimethylsiloxy-diphenylsiloxy copolymer, having a diphenylsiloxy content of 30 mole % and a degree of polymerization (D.P.) of 6-8 and 80 parts of chlorinated solvent (Permachlor, trichloroethylene, or equivalent) and the lens is allowed to cool to about 20°–25°C. A hydrophobic and dirt deposit resistance surface is obtained. The rub test rating is 0–2.

EXAMPLE 2

The procedure of Example 1 is repeated, using as the siliconizing medium, 10 parts of a methoxy chain-stopped dimethylsiloxy-diphenylsiloxy copolymer having a diphenylsiloxy content of 30 mol. % and a D.P. of 6–8; 10 parts of octamethylcyclotetrasiloxane; and 80 parts of chlorinated solvent. A hydrophobic and dirt deposit resistant surface is obtained. The rub test rating is 2–4.

EXAMPLE 3

The procedure of Example 1 is repeated, using as the siliconizing medium, 10 parts of a methoxy chain-stopped dimethylsiloxy diphenylsiloxy copolymer having a diphenylsiloxy content of 30 mol. % and a D.P. of 6–8; 10 parts of $\alpha$-hydroxy, $\omega$-dimethylhydroxysilyl poly(dimethylsiloxane), D.P. 4–7; and 80 parts of chlorinated solvent. A hydrophobic and dirt deposit resistant surface is obtained. The rub test rating is 0–2.

EXAMPLE 4

The procedure of Example 1 is repeated, using as the siliconizing medium 10 parts of methoxy chain-stopped dimethylsiloxy-diphenylsiloxy copolymer having a diphenylsiloxy content of 30 mol. % and a D.P. of 6–8; 10 parts of a silanol chainstopped dimethylsiloxy-diphenylsiloxy copolymer with a diphenylsiloxy content of 28 to 40% by weight; and 80 parts of chlorinated solvent. A hydrophobic and dirt deposit resistant surface is obtained. The rub test rating is 4–8. Specimens are annealed at 150°C. for 1 hour before cooling and then dirt tests are made. The dirt test readings are 14.0 initial; 33.5 after a spray rinse and 47.0 after sponge wash; showing easy removal of deposited dirt.

EXAMPLE 5

The procedure of Example 1 is repeated, substituting as the siliconizing medium, 10 parts of octamethylcyclotetrasiloxane; 10 parts of $\alpha$-hydroxy, $\omega$-dimethylhydroxysilyl poly(dimethylsiloxane), D.P. 4–7; and 80 parts of chlorinated solvent. A hydrophobic and dirt deposit resistant surface is obtained. The rub test rating is 2–4.

EXAMPLE 6

The procedure of Example 1 is repeated, substituting as the siliconizing medium, 10 parts of octamethylcyclotetrasiloxane; 10 parts of silanol chain-stopped dimethylsiloxydiphenylsilyloxy copolymer having a diphenylsiloxy content of 28 to 40% by weight; and 80 parts of chlorinated solvent. A hydrophobic and dirt deposit resistant surface is obtained. The rub test rating is 2–4. Specimens are annealed at 150°C. for 1 hour before cooling and dirt tests are made. The dirt test readings are 16.2 initial; 29.5 after a spray rinse and 45.5 after a sponge wash, showing easy removal of deposited dirt.

EXAMPLE 7

The procedure of Example of 1 is repeated, substituting as the siliconizing medium, 10 parts of $\alpha$-hydroxy, $\omega$-dimethylhydroxysilyl poly(dimethylsiloxane), D.P. 4–7; 10 parts of silanol chain-stopped dimethylsiloxy-diphenylsiloxy copolymer having a diphenylsiloxy content of 28 to 40% by weight; and 80 parts of chlorinated solvent. A hydrophobic and dirt deposit resistant surface is obtained. The rub test rating is 2–4. Specimens are annealed at 150°C. before cooling and dirt tests are made. The dirt test readings are 11.5 initial; 22 after a spray rinse and 45.5 after a sponge wash.

EXAMPLE 8

The procedure of Example 1 is repeated, substituting as the siliconizing medium, 5 parts of $\alpha$-hydroxy, $\omega$-dimethylhydroxysilyl poly(dimethylsiloxane), D.P. 4–7; 15 parts of methoxy chain-stopped dimethylsiloxy-diphenylsiloxy copolymer having a diphenylsiloxy content of about 30 mol. % and a D.P. of 6–8; and 80 parts of chlorinated solvent. A hydrophobic and dirt deposit resistant surface is obtained. The rub test rating is 0–2.

EXAMPLE 9

The procedure of Example 1 is repeated, substituting as the siliconizing medium, 15 parts of $\alpha$-hydroxy, $\omega$-dimethylhydroxysilyl poly(dimethylsiloxane), D.P. 4–7; 5 parts of methoxy chain-stopped dimethylsiloxy-diphenylsiloxy copolymer having a diphenylsiloxy content of about 30 mol. % and a D.P. of about 6–8; and 80 parts of chlorinated solvent. A hydrophobic and dirt deposit resistant surface is obtained. The rub test rating is 0–2.

EXAMPLE 10

The procedure of Example 1 is repeated, substituting as the siliconizing medium, 5 parts of a silanol chain-stopped dimethylsiloxy-diphenylsiloxy copolymer having a diphenylsiloxy content of 28 to 40% by weight; 15 parts of a methoxy chainstopped dimethylsiloxy-diphenylsiloxy copolymer having a diphenylsiloxy content of about 30 mol. % and a D.P. of about 6–8; and 80 parts of chlorinated solvent. A hydrophobic and dirt deposit resistant surface is obtained. The rub test rating is 2–8. Specimens are annealed at 150°C. before cooling and dirt tests are made. The dirt test readings are 12.5 initial; 36.5 after a spray rinse; and 48.5 after a sponge wash, showing easy removal of deposited dirt.

EXAMPLE 11

The procedure of Example 1 is repeated, substituting as the siliconizing medium, 15 parts of a silanol chain-stopped dimethylsiloxy-diphenylsiloxy copolymer having a diphenylsiloxy content of 28 to 40% by weight; 5 parts of a methoxy chainstopped dimethylsiloxy-diphenylsiloxy copolymer having a diphenylsiloxy content of about 30 mol. % and a D.P. of about 6–8; and 80 parts of chlorinated solvent. A hydrophobic and dirt deposit resistant surface is obtained. The rubtest rating is 4–8.

EXAMPLE 12

The procedure of Example 1 is repeated, substituting as the siliconizing medium, 1 part of a 10% solution in chlorinated solvent of a silanol chain-stopped dimethylsiloxy-diphenylsiloxy copolymer having a diphenylsiloxy content of 28 to 40% by weight and 7 parts of a 10% solution in chlorinated solvent of a methoxy chain-stopped dimethylsiloxy-diphenylsiloxy copolymer having a diphenylsiloxy content of about 30 mol. % and a D.P. of about 6–8. A hydrophobic and dirt deposit resistant surface is obtained. The rub test rating is 4–8.

EXAMPLE 13

The procedure of Example 1 is repeated, substituting as the siliconizing medium, 25 parts of silanol chain-stopped dimethylsiloxy-diphenylsiloxy copolymer having a diphenylsiloxy content of 28 to 40% by weight and 75 parts of a methoxy chainstopped dimethylsiloxy-diphenylsiloxy copolymer having a diphenylsiloxy content of about 30 mol. % and a D.P. of about 6–8. No chlorinated solvent is used. A hydrophobic and dirt deposit resistant surface is obtained. The rub test rating in two tests ranges from 0 to 8.

EXAMPLE 14

The procedure of Example 1 is repeated, substituting as the siliconizing medium, 10 parts of silanol chain-stopped dimethylsiloxy-diphenylsiloxy copolymer having a diphenylsiloxy content of 28 to 40% by weight; 30 parts of a methoxy chainstopped dimethylsiloxy-diphenylsiloxy copolymer having a diphenylsiloxy content of about 30 mol. % and a D.P. of about 6–8; and 40 parts of chlorinated solvent. A hydrophobic and dirt deposit resistant surface is obtained. The rub test rating is 4–8.

EXAMPLE 15

The procedure of Example is repeated, substituting as the siliconizing medium, 20 parts of a silanol chain-stopped dimethylsiloxy-diphenylsiloxy copolymer having a diphenylsiloxy content of 28 to 40% by weight; 60 parts of a methoxy chain-stopped dimethylsiloxy-diphenylsiloxy copolymer having a diphenylsiloxy content of about 30 mol. % and a D.P. of about 6–8; and 40 parts of chlorinated solvent. A hydrophobic and dirt deposit resistant surface is obtained. The rub test rating is 2–8.

EXAMPLE 16

The procedure of Example 1 is repeated, substituting as the siliconizing medium, 10 parts of a curable, silanol-containing non-resinous methylsiloxane fluid prepared by hydrolysis of a blend of 50–75 parts of $(CH_3)_2SiCl_2$; 1–10 parts of $(CH_3)_3SiCl$, and 10–35 parts of $CH_3SiCl_3$; 10 parts of octamethylcyclotetrasiloxane; and 10 parts of chlorinated solvent. A hydrophobic and dirt deposit resistant surface is obtained. The rub test rating is 4–10. Specimens are annealed at 150°C. before cooling and dirt tests are made. The dirt test readings are 15.0 and 13.0, initial; 29.5 and 35.0 after a spray rinse; and 46.5 and 47.5 after a sponge wash, showing easy removal of deposited dirt.

EXAMPLE 17

The procedure of Example 1 is repeated, substituting as the siliconizing medium, 10 parts of a curable, silanol-containing non-resinous methylsiloxane fluid prepared as described in Example 16; 10 parts of $\alpha$-hydroxy, $\omega$-dimethylhydroxysilyl poly(dimethylsiloxane) having a D.P. of 4–7; and 10 parts of chlorinated solvent. A hydrophobic and dirt deposit resistant surface is obtained. The rub test rating is 2–10 in four series of tests. Specimens are annealed at 150°C. for 1 hour before cooling and dirt tests are made. The dirt test readings are 14.5 and 11.5, initial; 30.0 and 34.5 after a spray rinse; and 47.5 and 46.5 after a sponge wash, showing easy removal of deposited dirt.

EXAMPLE 18

The procedure of Example 1 is repeated, substituting as the siliconizing medium, 10 parts of the curable, silanol-containing non-resinous methylsiloxane fluid prepared as described in Example 16; 10 parts of a silanol chain-stopped dimethylsiloxydiphenylsiloxy copolymer having a diphenylsiloxy content of about 28 to 40% by weight; and 10 parts of chlorinated solvent. A hydrophobic and dirt deposit resistant surface is obtained. The rub test rating is from 4 to 10. Specimens are annealed at 150°C for 1 hour before cooling and dirt tests are made. The dirt test readings are 14.0 and 13.5, initial; 26.5 and 36.5 after a spray rinse; and 47.5 and 48.5 after a sponge wash, showing easy removal of deposited dirt.

EXAMPLE 19

The procedure of Example 1 is repeated, substituting as the siliconizing agent, 10 parts of a curable, silanol-containing non-resinous methylsiloxane fluid prepared as described in Example 16; 10 parts of a methoxy chain-stopped dimethylsiloxydiphenylsiloxy copolymer having a dimethylsiloxy content of about 30 mol. % and a D.P. of about 6–8; and 10 parts of chlorinated solvent. A hydrophobic and dirt deposit resistant surface is obtained. The rub test rating is 2–8. Specimens are annealed at 150°C. for 1 hour before cooling and dirt tests are made. The dirt test readings are 15.0 and 11.5, initial; 28.0 and 32.0 after a spray rinse; and 46.5 and 46.0 after a sponge wash, showing easy removal of the dirt.

EXAMPLE 20

The procedure of Example 1 is repeated, substituting as the siliconizing medium 10 parts of octamethylcyclotetrasiloxane; 10 parts of $\alpha$-hydroxy, $\omega$-dimethylhydroxysilyl poly(dimethylsiloxane) having a D.P. of 4–7; and 10 parts of chlorinated solvent. A hydrophobic and dirt deposit resistant surface is obtained. The rub test rating is 2–4.

EXAMPLE 21

The procedure of Example 1 is repeated, substituting as the siliconizing medium, 10 parts of octamethylcyclotetrasiloxane; 10 parts of a silanol chain-stopped dimethylsiloxy-diphenylsiloxy copolymer having a diphenylsiloxy content of 28 to 40% by weight; and 10 parts of chlorinated solvent. A hydrophobic and dirt deposit resistant surface is obtained. The rub test rating is 2–4.

EXAMPLE 22

The procedure of Example 1 is repeated, substituting as the siliconizing medium, 10 parts of octamethylcyclotetrasiloxane; 10 parts of a methoxy chain-stopped dimethylsiloxy-diphenylsiloxy copolymer having a diphenylsiloxy content of about 30 mol. % and a D.P. of about 6–8; and 10 parts of chlorinated solvent. A hydrophobic and dirt deposit resistant surface is obtained. The rub test rating is 2–4.

EXAMPLE 23

The procedure of Example 1 is repeated, substituting as the siliconizing medium, 10 parts of $\alpha$-hydroxy, $\omega$-dimethylhydroxysilyl poly(dimethylsiloxane), D.P. P. of about 4–7; 10 parts of a silanol chain-stopped dimethylsiloxy-diphenylsiloxy copolymer having a diphenylsiloxy content of about 40% by weight; and 10 parts of chlorinated solvent. A hydrophobic and dirt deposit resistant surface is obtained. The rub test rating is 4–10.

EXAMPLE 24

The procedure of Example 1 is repeated, substituting as the siliconizing medium, 10 parts of $\alpha$-hydroxy, $\omega$-dimethylhydroxysilyl poly(dimethylsiloxane) having a D.P. of about 4–7; 10 parts of methoxy chain-stopped dimethylsiloxy-diphenylsiloxy copolymer having a diphenylsiloxy content of about 30 mol. % and a D.P. of about 6–8; and 10 parts of chlorinated solvent. A hydrophobic and dirt deposit resistant surface is obtained. The rub test rating is 0–2.

EXAMPLE 25

The procedure of Example 1 is repeated, substituting as the siliconizing medium, 10 parts of silanol chain-stopped dimethylsiloxy-diphenylsiloxy copolymer having a diphenylsiloxy content of 28 to 40% by weight; 10 parts of a methoxy chainstopped dimethylsiloxy-diphenylsiloxy copolymer having a diphenylsiloxy content of about 30 mol. % and a D.P. of about 6–8; and 10 parts of a chlorinated solvent. A hydrophobic and dirt deposit resistant surface is obtained. The rub test rating is 2–8.

EXAMPLE 26

The procedure of Example 1 is repeated, substituting as the siliconizing medium, 10 parts of a curable, silanol-containing, non-resinous methylsiloxane fluid prepared as described in Example 16; 10 parts of a silicone composition comprising 6% methyl trisiloxy units; 11% trimethyl siloxy units and 83% dimethyldisiloxy units; and 10 parts of chlorinated solvent. A hydrophobic and dirt deposit resistant surface is obtained.

EXAMPLE 27

The procedure of Example 1 is repeated, substituting as the siliconizing medium, 10 parts of a curable, silanol-containing, non-resinous methylsiloxane fluid prepared as described in Example 16; 10 parts of a silicone composition comprising 93% dimethyldisiloxy units; 7% methyl trisiloxy units and 1–2% by weight of silicon-bonded hydroxyl groups; and 10 parts of chlorinated solvent. A hydrophobic and dirt resistant surface is obtained.

EXAMPLE 28

The procedure of Example 1 is repeated, substituting as the siliconizing medium, 10 parts of a curable, silanol-containing, non-resinous methylsiloxane fluid prepared as described in Example 16; 10 parts of a silicone composition comprising polymethyl hydrogen siloxy units chain-stopped with trimethylsiloxy units; and 10 parts of chlorinated solvent. A hydrophobic and dirt deposit resistant surface is obtained.

EXAMPLE 29

The procedure of Example 1 is repeated, substituting for the siliconizing medium, 20 parts of a curable, silanolcontaining, non-resinous methylsiloxane fluid prepared by hydrolysis of a blend of 50–75% $(CH_3)_2SiCl_2$; 1–10% of $(CH_3)_3SiCl$; and 10–35% of $CH_3SiCl_3$; and 80 parts of chlorinated solvent. A hydrophobic and dirt deposit resistant surface is obtained. The rub test rating is 4–8. Specimens are annealed at 150°C. for 1 hour and dirt tests are made. The dirt test readings are 15.5 and 13.0, initially; 33.5 and 34.0 after a spray rinse; and 48.0 and 45.5 after a sponge wash, showing easy removal of the dirt.

In a series of tests carried out at surface application temperatures of between 295°C. and 370°C., followed by the rub test, it is found that between 295°C. and 310°C., the rub test ratings are fair to good, predominantly fair; between 310°C. and 370°C., the rub test results are fair to excellent, predominantly good; and at 370°C. and above, fair to poor, predominantly poor above 370°C.

In a series of tests carried out at surface application temperatures of between 350° and 370°C., it is found that a short contact time, e.g., 15–20 seconds with the siliconizing medium is preferable to longer; e.g., 30 to 60 seconds, in producing a rub resistant surface treatment.

Obviously, other modifications and variations of the present invention are possible in the light of the above teachings. It is, therefore, to be understood that changes may be made in the particular embodiments of the invention described which are within the full intended scope of the invention as defined in the appended claims.

We claim:
1. A method for producing water repellant and dirt deposit resistant characteristics on a vitreous surface of an article, the method comprising:
   a. heating an article having a vitreous surface to a surface temperature of above about 400°C. until the surface of said article is substantially free of water;
   b. adjusting the surface temperature of said article to from about 310° to about 370°C. and applying to the surface of said article a siliconizing medium comprising an organosiloxane having at least one silicon-carbon bond; and
   c. allowing said article to cool to ambient temperature.

2. A method as defined in claim 1 which also includes the step of annealing said article after step (b) at a surface temperature of from about 100°C. to about 200°C. for a time at least sufficient to enhance the permanency of the water repellant and dirt deposit resistance surface characteristics of said vitreous article.

3. A method as defined in claim 1 wherein said siliconizing medium comprises an organopolysiloxane having hydroxy or alkoxy terminal groups.

4. A method for producing water repellant and dirt deposit resistant characteristics on a vitreous surface of an article, the method comprising:
   a. heating an article having a vitreous surface to a surface temperature of above about 400°C. until the surface of said article is substantially free of water;
   b. adjusting the surface temperature of said article to from about 310° to about 370°C. and applying to the surface of said article a siliconizing medium comprising an organosiloxane; and
   c. allowing said article to cool to ambient temperature,
   wherein said siliconizing medium comprises an organopolysiloxane having hydroxy or alkoxy terminal groups, and wherein said organopolysiloxane is substituted with silicon-bonded alkyl groups, silicone-bonded aryl groups, silicon-bonded alkenyl groups, silicon-bonded alkaryl groups, silicon-bonded aralkyl groups, silicon-bonded cycloaliphatic groups, or a mixture of any of the foregoing.

5. A method as defined in claim 4 wherein said alkyl groups contain from 1 to 7 carbon atoms and, if present, said alkoxy groups contain from 1 to 7 carbon atoms.

6. A method as defined in claim 4 wherein said organopolysiloxane is a linear or branched organopolysiloxane substituted with silicon-bonded alkyl groups, silicon-bonded phenyl groups, or a mixture thereof.

7. A method as defined in claim 6 wherein said organopolysiloxane is susbitututed with a mixture of silicon-bonded alkyl groups and silicon-bonded phenyl groups, in which the silicon-bonded alkyl groups predominate.

8. A method as defined in claim 6 wherein the siliconbonded alkyl groups are methyl groups.

9. A method as defined in claim 7 wherein the siliconbonded alkyl groups are methyl groups.

10. A method as defined in claim 1 wherein said siliconizing medium comprises a blend of two or more organopolysiloxanes.

11. A method as defined in claim 10 wherein at least one of the polyorganosiloxanes in said blend is substituted with silicon-bonded methyl groups and includes a relatively high proportion of silicon-bonded hydroxyl groups.

12. A method as defined in claim 4 wherein said siliconizing medium comprises a blend of two or more organopolysiloxanes, at least one of which is substituted with silicon-bonded methyl groups and includes a relatively high proportion of silicon-bonded hydroxyl groups, and wherein said organopolysiloxane is of the formula:

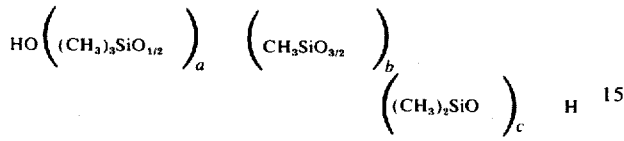

wherein $a$ is from about 0.02 to about 1.0; $b$ is from about 0.11 to about 1.4 and $c$ is 1.0.

13. A method as defined in claim 4 wherein said siliconizing medium comprises a blend of two or more organopolysiloxanes, and wherein at least one of the organopolysiloxanes is a polydimethylsiloxane having hydroxy or alkoxy terminal groups, a copolymer of dimethylsiloxy units and diphenylsiloxy units having hydroxy or alkoxy terminal groups or a cyclic organopolysiloxane substituted with silicon-bonded alkyl groups, silicon-bonded aryl groups, silicon-bonded alkaryl groups, silicon-bonded aralkyl groups, silicon-bonded cycloaliphatic groups, silicon-bonded alkenyl groups, or a mixture of any of the foregoing.

14. A method as defined in claim 13 wherein said organopolysiloxane is of the formula:

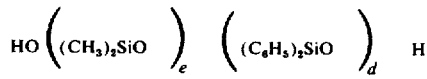

wherein $d$ is from about 0.1 to about 0.4 and $e$ is 1.0.

15. An article having a water repellant and dirt resistant vitreous surface, the water repellant and dirt resistant characteristics of the surface having been provided by the method comprising:
  a. heating an article having a vitreous surface to a surface temperature of above about 400°C. until the surface of said article is substantially free of water;
  b. adjusting the surface temperature of said article to from about 310° to about 370°C. and applying to the surface of said article a siliconizing medium comprising an organosiloxane capable of producing enhanced water repellent and dirt deposit resistant surface characteristics thereon, said organosiloxane having at least one silicon-carbon bond; and
  c. allowing said article to cool to ambient temperature.

16. An article as defined in claim 15 which comprises glass, a vitrified substrate, quartz, silica or a siliceous derivative.

17. An article as defined in claim 15 wherein said surface characteristics have been provided by a method as recited which also includes the step of annealing said article after step (b) at a surface temperature of from about 100°C. to about 200°C. for a time at least sufficient to enhance the permanency of the water repellant and dirt deposit resistance surface characteristics of said vitreous article.

18. An article as defined in claim 15 wherein said siliconizing medium comprises an organopolysiloxane having hydroxy or alkoxy terminal groups.

19. An article having a water repellant and dirt resistant vitreous surface, the water repellant and dirt resistant characteristics of the surface having been provided by the method comprising:
  a. heating an article having a vitreous surface to a surface temperature of above about 400°C. until the surface of said article is substantially free of water;
  b. adjusting the surface temperature of said article to from about 310° to about 370°C. and applying to the surface of said article a siliconizing medium comprising an organopolysiloxane capable of producing enhanced water repellant and dirt resistant surface characteristics thereon; and
  c. allowing said article to cool to ambient temperature, wherein said siliconizing medium comprises an organopolysiloxane having hydroxy or alkoxy terminal groups and wherein said organopolysiloxane is substituted with silicon-bonded alkyl groups, silicon-bonded aryl groups, silicon-bonded alkenyl groups, silicon-bonded alkaryl groups, silicon-bonded aralkyl groups, silicon-bonded cycloaliphatic groups, or a mixture of any of the foregoing.

20. An article as defined in claim 19 wherein said alkyl groups contain from 1 to 7 carbon atoms and, if present, said alkoxy groups contain from 1 to 7 carbon atoms.

21. An article as defined in claim 19 wherein said organopolysiloxane is a linear or branched organopolysiloxane substituted with silicon-bonded alkyl groups, silicon-bonded phenyl groups, or a mixture thereof.

22. An article as defined in claim 21 wherein said organopolysiloxane is substituted with a mixture of silicon-bonded alkyl groups and silicon-bonded phenyl groups, in which the silicon-bonded alkyl groups predominate.

23. An article as defined in claim 20 wherein the silicon-bonded alkyl groups are methyl groups.

24. An article as defined in claim 22 wherein the silicon-bonded alkyl groups are methyl groups.

25. An article as defined in claim 15 wherein said siliconizing medium comprises a blend of two or more organopolysiloxanes.

26. An article as defined in claim 25 wherein at least one of the polyorganosiloxanes in said blend is substituted with silicon-bonded methyl groups and includes a relatively high proportion of silicon-bonded hydroxyl groups.

27. An article as defined in claim 19 wherein said siliconizing medium comprises a blend of two or more organopolysiloxanes, at least one of which is substituted with silicon-bonded methyl groups and includes a relatively high proportion of silicon-bonded hydroxyl groups and wherein said organopolysiloxane is of the formula:

wherein $a$ is from about 0.02 to about 1.0; $b$ is from about 0.11 to about 1.4 and $c$ is 1.0.

28. An article as defined in claim 19 wherein said siliconizing medium comprises a blend of two or more organopolysiloxanes, and wherein at least one of the organopolysiloxanes is a polydimethylsiloxane having hydroxy or alkoxy terminal groups, a copolymer of dimethylsiloxy units and diphenylsiloxy units having hydroxy or alkoxy terminal groups or a cyclic organopolysiloxane substituted with silicone-bonded alkyl groups, silicon-bonded aryl groups, silicon-bonded alkaryl groups, silicon-bonded aralkyl groups, silicon-bonded cycloaliphatic groups, silicon-bonded alkenyl groups, or a mixture of any of the foregoing.

29. An article as defined in claim 19 wherein said siliconizing medium comprises a blend of two or more organopolysiloxanes and wherein at least one of the organopolysiloxanes in said blend is substituted with silicon-bonded methyl groups, silicon-bonded-phenyl groups and includes silicon-bonded hydroxyl terminal groups.

30. An article as defined in claim 19 wherein said siliconizing medium comprises an organopolysiloxane of the formula:

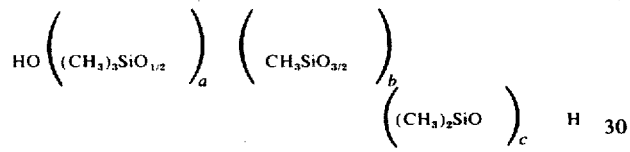

wherein $a$ is from about 0.02 to about 1.0; $b$ is from about 0.11 to about 1.4 and $c$ is 1.0.

31. A method as defined in claim 1 wherein said article is heated above about 400°C. in step (a) for a period of at least about 5 minutes.

32. A method as defined in claim 8 wherein said article is heated above about 400°C. in step (a) for a period of at least about 5 minutes.

33. A method as defined in claim 5 wherein said article is heated above about 400°C. in step (a) for a period of from 5 to 30 minutes.

34. A method as defined in claim 14 wherein said article is heated above about 400°C. in step (a) for a period of from 5 to 30 minutes.

35. An article as defined in claim 20 wherein said article is heated above about 400°C. in step (a) for a period of at least about 5 minutes.

36. An article as defined in claim 27 wherein said article is heated above about 400°C. in step (a) for a period of at least about 5 minutes.

37. An article as defined in claim 15 wherein said article is heated above about 400°C. in step (a) for a period of from 5 to 30 minutes.

38. An article as defined in claim 24 wherein said article is heated above about 400°C. in step (a) for a period of from 5 to 30 minutes.

39. A method for improving the surface characteristics of a vitreous surface of an article by a treatment comprising:
a. heating an article having a vitreous surface to a surface temperature of above about 400°C. for a period of 5 to 30 minutes until the surface of said article is substantially free of water;
b. adjusting the surface temperature of said article to from about 310° to about 370°C. and applying to the surface of said article a siliconizing medium comprising an organosiloxane capable of producing enhanced and durable water repellent and dirt deposit resistant surface characteristics thereon, said organosiloxane having at least one silicon-carbon bond; and
c. allowing said article to cool to ambient temperature.

40. A method for improving the surface characteristics of a vitreous surface of an article by a treatment comprising:
a. heating an article having a vitreous surface to a surface temperature of above about 400°C. for a period of 5 to 30 minutes until the surface of said article is substantially free of water; and
b. adjusting the surface temperature of said article to from about 310° to about 370°C. and applying to the surface of said article a siliconizing medium comprising a blend of an organopolysiloxane of the formula:

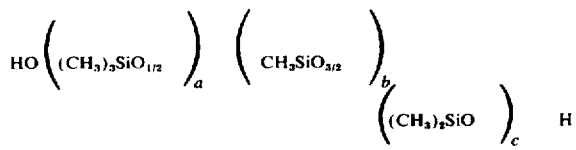

and corresponding to the product of hydrolyzing 50–75% by weight of $(CH_3)_2SiCl_2$; 1–10% by weight of $(CH_3)_3SiCl$; and 10–35% by weight of $CH_3SiCl_3$, and a second organopolysiloxane copolymer of the formula:

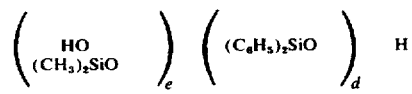

wherein $d$ is from about 0.14 to about 0.25, $e$ is 1.0 and said diphenylsiloxy units amount to about 28 to 40% of the total weight of recurring units; and
c. allowing said article to cool to ambient temperature.

41. An article having a water repellent and dirt resistant vitreous surface, the water repellent and dirt resistant characteristics of the surface having been provided by the method comprising:
a. heating an article having a vitreous surface to a surface temperature of above about 400°C. for a period of at least about 5 minutes until the surface of said article is substantially free of water;
b. adjusting the surface temperature of said article to from about 310° to about 370°C. and applying to the surface of said article a siliconizing medium comprising a blend of an organopolysiloxane of the formula:

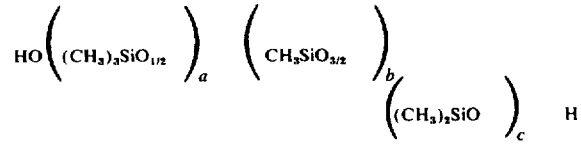

and corresponding to the product of hydrolyzing 50–75% by weight of $(CH_3)_2SiCl_2$; 1–10% by weight of $(CH_3)_3SiCl$; and 10–35% by weight of $CH_3SiCl_3$, and a second organopolysiloxane copolymer of the formula:

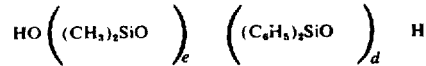

wherein $d$ is from about 0.14 to about 0.25, $e$ is 1.0 and said diphenylsiloxy units amount to about 28 to 40% of the total weight of recurring units; and c. allowing said article to cool to ambient temperature.

* * * * *